Sept. 24, 1940.                    C. L. ORR                      2,216,093
                                  CAR TRUCK
                            Filed March 24, 1938           7 Sheets-Sheet 1

Inventor
C. L. Orr,
By Seymour, Bright & Nottingham.
Attorneys

Sept. 24, 1940.   C. L. ORR   2,216,093
CAR TRUCK
Filed March 24, 1938   7 Sheets-Sheet 4

Inventor
C. L. Orr,
By Seymour, Bright + Nottingham
Attorneys Sept. 24, 1940.　　　　C. L. ORR　　　　2,216,093
CAR TRUCK
Filed March 24, 1938　　　　7 Sheets-Sheet 5

Inventor
C. L. Orr,
By Seymour, Bright & Nottingham
Attorneys

Sept. 24, 1940.   C. L. ORR   2,216,093
CAR TRUCK
Filed March 24, 1938   7 Sheets-Sheet 6

Inventor
C. L. Orr,
By Seymour, Bright & Nottingham.
Attorneys

Patented Sept. 24, 1940

2,216,093

UNITED STATES PATENT OFFICE 2,216,093

CAR TRUCK

Claude L. Orr, Columbus, Ohio, assignor to The Buckeye Steel Castings Company, Columbus, Ohio Application March 24, 1938, Serial No. 197,927

18 Claims. (Cl. 105—183)

This invention relates to improvements in eight-wheel car trucks. In such a construction, it is desirable to distribute the load of present day heavy railway vehicle running at high speeds, over a greater number of wheels, in order that high maintenance costs due to rapid deterioration of the wheels may be materially reduced.

When the number of axles and wheels per truck is increased, it is highly desirable to provide effective means of equalizing the load on the wheels. Sluggish and improper equalization of the load on the truck to the wheels, due to track irregularities, cross-overs, etc., causes high maximum wheel loads and defeats the purpose of increasing the number of wheels per truck.

With the foregoing in mind, my improved truck construction has been conceived and designed with the following objects in view:

(1) To increase the number of wheels per truck or vehicle, thereby reducing the load per wheel and its resultant damage to wheels in high-speed service.

(2) To provide an effectively equalized eight-wheel truck so that the equalizing system quickly responds to track irregularities and the wheels carry only their proper proportion of the truck load.

(3) To provide an eight-wheel truck in which the bolster system is maintained in a plane parallel to the vehicle body regardless of ordinary track conditions or differences in wheel diameters.

(4) To provide an eight-wheel truck having sufficient transverse flexibility to negotiate curves, thereby reducing wheel flange pressures and lateral forces on journals as compared with rigid frame trucks.

(5) To furnish a truck construction having flexibility in both the vertical and transverse planes, which permits the advantages mentioned above in conforming to irregular track conditions and curves.

(6) To supply an eight-wheel truck having improved means for supporting portions of the braking system whereby eccentric forces on the side frames are eliminated.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In accordance with the invention, the body, (not shown), of the railway car or vehicle, bears on the center bolster 1, provided with a center plate 2, permitting swivel of the truck relatively to the load carrying means, or body. The center bolster rests at its ends on two transverse bolsters 3 at four inclined bearing surfaces 4 (see Fig. 3). The foregoing members comprise the bolster system which is supported by spring groups 5 arranged at each end of the transverse bolsters, and supported by the side frame system.

The side frame system at each side of the truck is made up of two end frame members 6; an equalizer member 7; and an intermediate frame member 8. The end members have pedestal structures 9 resting on axle journal housing 10, and the inner end of each member 6 is secured to one end of the equalizer member 7 by a retaining pin 11. The pin does not form a pivotal connection, but has clearance with a hole through the end of the member 6, as indicated at 12, (see Fig. 5). The inner end of each member 6 bears on an equalizer wear block 13 having a horizontal plane surface 13a at the top and a partially cylindrical surface 13b at its bottom. The form of the wear block permits the end of the member 7 to slide on the block longitudinally of the truck, and also rotate or turn in a vertical plane relatively to the member 6.

The ends of the intermediate member 8 have pedestal structures 9a mounted on the journal boxes 10a of the axles 5d of the intermediate wheels 5b.

The member 7 is rockably supported through the medium of a rocker member 14 on the intermediate member 8, and the equalizer member 7 is restrained from longitudinal movement relatively to the intermediate member by means of contacting surfaces 15 (see Fig. 4) on the frame and rocker and the retaining bolt 16. It is to be understood that instead of the equalizer member being rotatably supported on the intermediate member 8, it can be pivotally connected to the latter as would be the case if the member 14 were not present, and a large pin were inserted through aligned apertures in the members 7 and 8.

Equal load to each of the four axle journals at each side of the truck is accomplished by the bolster system which is symmetrical about both the longitudinal and transverse center lines, and the side frame system, which is designed so that the distances A on the end frame members 6 are equal and also the arms of the equalizer member indicated by the distances B. Thus if it is considered that two units of loads are imposed upon the spring groups 5, then one unit will be carried by the end wheel 5a, and one unit on one end of the equalizer member 7. Likewise the opposite end frame member 6 will distribute one unit of load to the other end wheel and one unit to the adjacent end of the equalizer member 7. Therefore, the intermediate member 8 carries two units of load at its center line and distributes one unit to each of the intermediate wheels 5b, which is equal to the load carried by the end wheels 5a.

The equalizer member 7 functions in a manner to maintain the bolster system in a plane parallel with the center plate 2 by rocking or rotating sufficiently to compensate for irregular track or differences in wheel diameters. For example, should one of the end axles 5c be raised two units of vertical distance, the bolster center plate, by the principle of work, would raise one-half unit or two units divided by four (the number of axles). The spring seat of the end side frame adjacent to the raised axle would elevate one unit due to the axle, and the end of the equalizer would lower one unit affecting the spring seat of the side frame by one-half that amount, and the net movement of the frame spring seat would be one-half unit upward. The opposite end of the equalizer would necessarily rise one unit, thereby raising the opposite end frame spring seat one-half unit and the bolster system would be horizontal regardless of the local condition affecting the one end axle.

Conditions affecting other wheels would be taken care of in a similar manner.

It will be seen from the foregoing that the side frame system on one side of the truck construction may act independently of the other side, and irregularities in each rail of the track may be negotiated with proper equalization of the load between the four axle journals or wheels on each side of the truck.

Referring to the braking mechanism of the truck, the supporting means therefor is best shown in Figs. 7 to 11 inclusive. In those figures, 20 designates an air cylinder mounted on a bracket 21 that is secured to one end 22 of each of the transverse bolsters 3.

Figure 7:
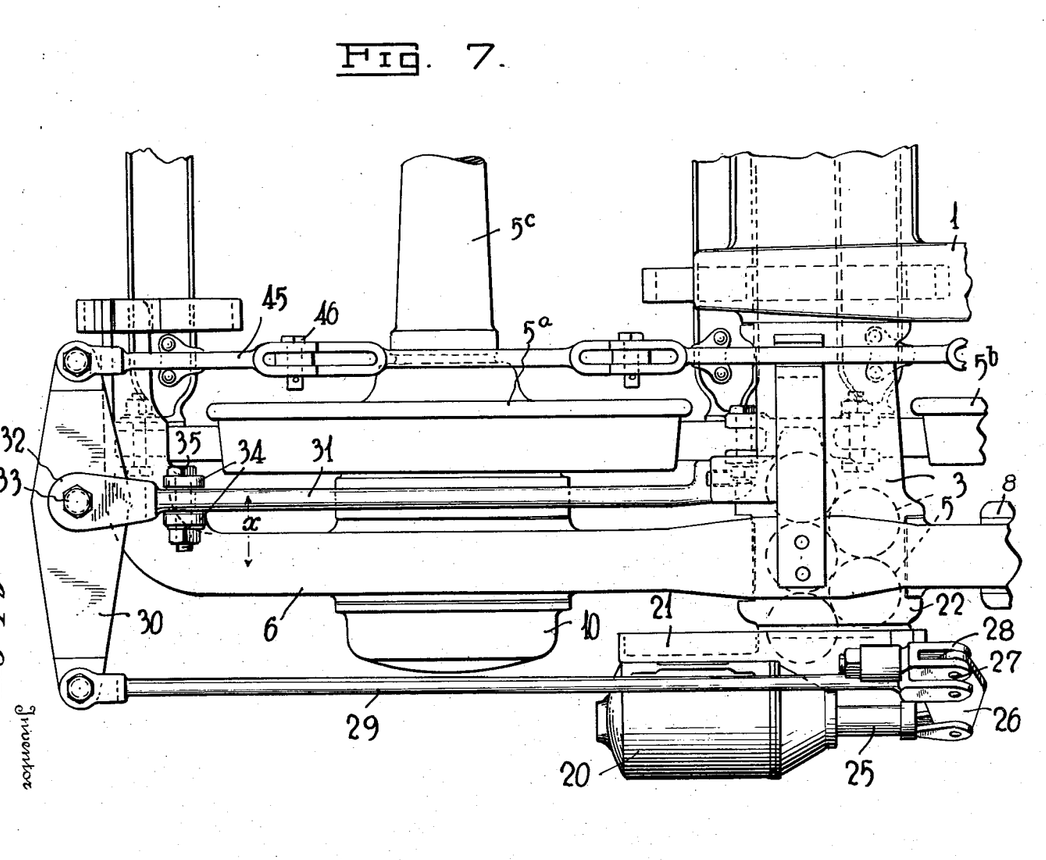
Fig. 7 is an enlarged top plan view of one corner of the truck showing my improved means for supporting a portion of the braking system.
Figure 8:
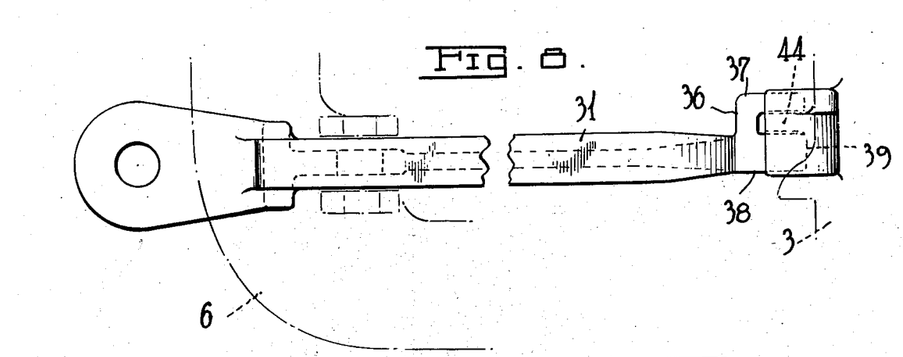
Fig. 8 is a top plan view of one of the fulcrum bars and its supporting means, the latter being shown in dot and dash lines.
Figure 9:
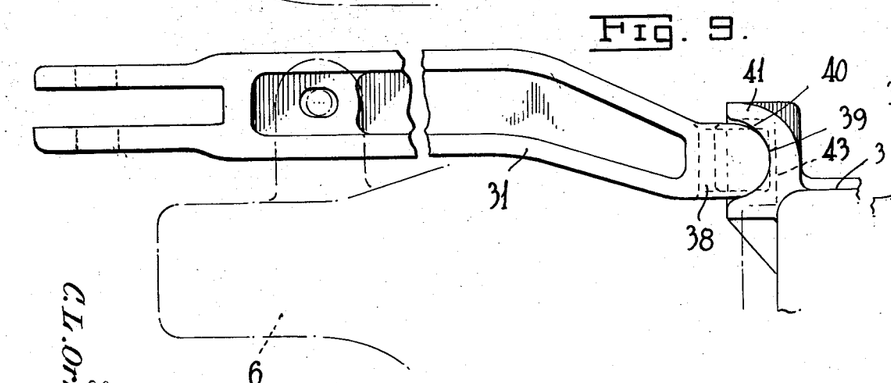
Fig. 9 is a side elevation of the same.

The air cylinder piston rod 25 is pivotally connected to the lower end of a lever 26 that is pivotally suspended from a pin 27 carried by a bolt member 28 which is secured to the upper end of the bracket 21. A brake pull rod 29 has one of its ends pivotally connected to the medial portion of the lever and its other end pivotally connected to the outer extremity of a horizontal lever 30. The latter is supported by a fulcrum bar 31, which in turn is supported by the truck in a novel way. This fulcrum bar is provided at one end with a fork 32 pivotally connected at 33 to the medial portion of the lever 30. Upstanding arms or lugs 34 are arranged at the end portion of one of the end members 6 of the side frame system and they are positioned to one side of the longitudinal axis of this member. A bolt 35 passes loosely through the medial portion of the fulcrum bar and pivotally connects the latter to the side frame member 6.

The other end of the fulcrum bar, as best shown in Figs. 8 to 11 inclusive, also is of fork shape, but the fork is arranged at right angles to the fork at the other end of the bar. The fork 36 consists of two fingers 37 and 38. The finger 38 has an arc-shaped end 39 extending into an arc-shaped cavity 40 in a pocket 41. As the pocket is mounted on the transverse bolster 3, it will be understood that the inner end of the fulcrum bar is supported by the transverse bolster.

Figure 10:
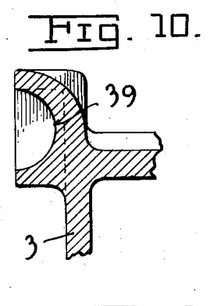
Fig. 10 is a vertical sectional view of the pocket on one of the transverse bolsters which supports one end of the fulcrum bar; the section being taken on the line 10—10 of Fig. 11.
Figure 11:
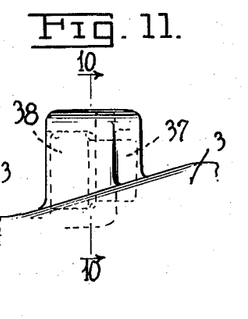
Fig. 11 is an elevation of said pocket and a portion of the transverse bolster on which it is arranged.

The finger 37 is of generally rectangular shape, and it fits into a complementary recess 43 formed in the pocket and separated from the cavity 39 by a vertical partition 44 which prevents the inner end of the fulcrum bar from moving transversely. The pocket is so constructed that all the force developed in the fulcrum bar due to braking is transmitted from the bar to the transverse bolster through the respective arc-shaped surfaces 39 and 40. The finger 37 serves only to prevent transverse displacement of the fulcrum bar.

The inner end of each lever 30 is pivotally connected to a rod 45 which is in turn pivotally connected at 46 to a conventional clasp brake system for one-half of one side of the truck.

Dead levers 95 forming part of said conventional brake system have their upper ends pivotally suspended from hanger brackets 96 rigidly united with the intermediate side frame members 8. Their medial portions are pivotally connected to the medial portions of live levers 97 by means of pull rods 100. Other pull rods 101 supported by brackets on the end members 6 of the side frame system, carry the live levers 97 and also live levers 98. The medial portions of the levers 98 are connected to the medial portions of other live levers 99 which have their upper ends pivotally connected to the rods 45 by the pins 46.

In operation of the brakes, the turning movement of the lever 30 about its connection to the fulcrum bar 31 develops a compressive axial force to "push" in the bar. As the center line of the fulcrum bar is not aligned with the center line of the side frame member 6 by the distance marked X, any force applied to a bracket integral with the side frame member at the same location would cause eccentric force on the side frame member, tending to rotate it in a direction opposite to the movement of the lever 30. By using the fulcrum bar which is only supported and guided by the bracket 34 on the side frame member, the entire axial force developed in the fulcrum bar is resisted by the transverse bolster carrying the pocket into which the inner end of the fulcrum bar extends. Since the brake system is symmetrical about the longitudinal center line of the truck, the loading on the other end of the transverse bolster 3, due to brake forces, is identical with the above described loading, and the transverse bolster is, therefore, not eccentrically loaded.

Figure 12:
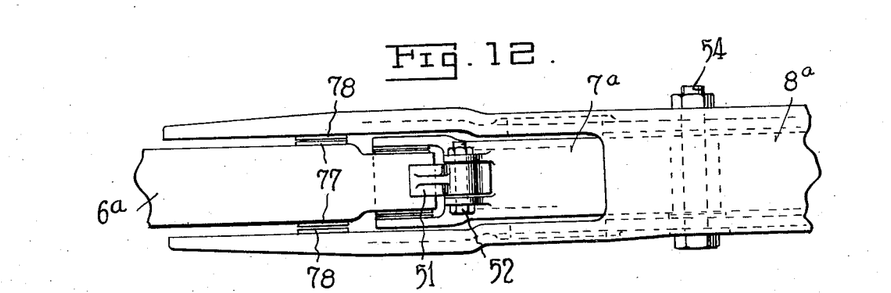
Fig. 12 is a top plan view of a portion of another modification.
Figure 13:
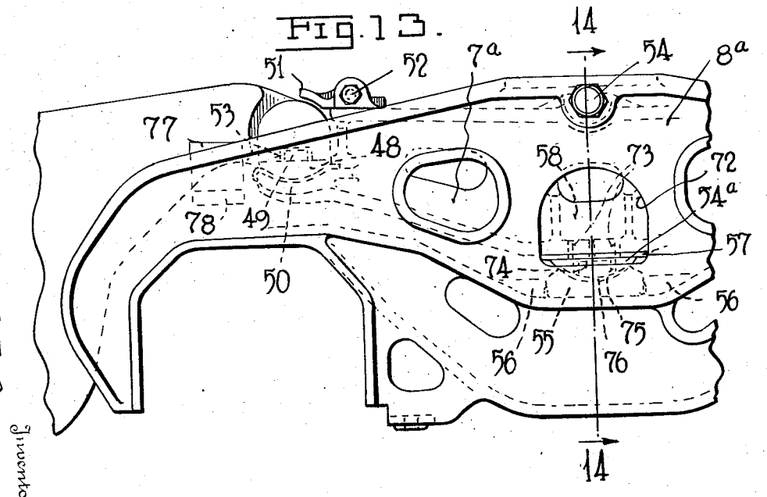
Fig. 13 is a side elevation of the same.
Figure 14:
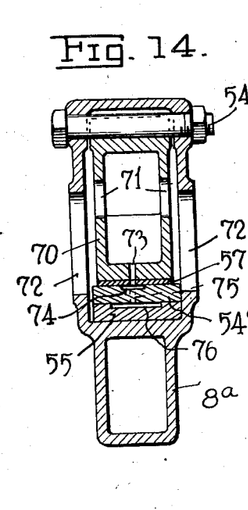
Fig. 14 is a transverse vertical sectional view taken on the line 14—14 of Fig. 13.

In the embodiment of the invention illustrated in Figs. 12 to 14 inclusive, each of the end side frame members 6a is rockably and slidably supported on the equalizer member 7a by means of a wearing block 48 having an upstanding post 49. Such block has an arc-shaped bottom rockably resting upon an arc-shaped seat 50 formed at the end of the equalizer member 7a. Separation of the members 6a and 7a is prevented by a bracket 51 which is secured to the eqalizer member by any suitable means such as a bolt 52. Relative longitudinal movement between the members 6a and 7a, during equalization operation, is permitted by the clearance between the walls of the recess 53 in the bottom of the end of the member 6a, and the lug 49, and also between the upper surface of the end of the member 6a and the bracket 51.

The equalizer member 7a is pivotally connected to the intermediate side frame member 8a by means of a bolt 54. The bolt does not transfer any of the load from the equalizer to the member 8a, but serves only to prevent relative longitudinal movement between the equalizer and this member. The member 7a is rockably slidably supported upon the member 8a by means of the wearing block 54a having an arc-shaped bottom portion which rests upon a cooperating top portion of a seat 55. In this construction, the equalizer member operates inside the intermediate member 8a, so that the parts 54a and 55 are held in position transversely by the side walls of the intermediate member. The rocker seat 55 is prevented from moving longitudinally by lugs 56 which are preferably cast integral with the member 8a. When the equalizer turns about the bolt 54 during equalization operations, the seat between the equalizer and frame must accommodate both relative horizontal motion and oscillation. The horizontal motion is accommodated by slipping action which occurs between the engaging faces of a wear plate 57 (welded to the equalizer) and the wearing block 54a. Angular turning is accommodated by the cooperating arc-shaped surfaces of the parts 54a and 55.

For lubrication purposes, a cavity 58 is arranged within the equalizer immediately above the rocking support, and this cavity may be reached through apertures 71 and 72 in the members 7a and 8a. This cavity is for the purpose of holding waste or other suitable material saturated with lubricating oil. Vertical ducts 73 carry oil from the cavity to the horizontal wearing surfaces, and an oil groove 74 in the top of the member 54a contributes to the distribution of the oil over the horizontal surfaces between the parts 54a and 57. Other ducts 75 carry oil through the wearing block to the arc-shaped surfaces. Another oil groove 76 contributes to the distribution of the oil over the arc-shaped surfaces.

As best shown in Fig. 12, the end frame member 6a is provided with external wearing plates 77 which cooperates with internal wearing plates 78 on the intermediate frame member 8a. These plates not only furnish wearing surfaces during equalization operations, but also tend to hold these members in vertical alignment.

Figure 15:
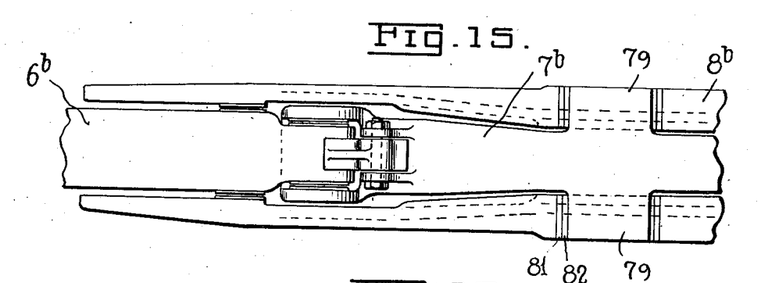
Fig. 15 is a view similar to Fig. 12, but illustrating another embodiment of the invention.
Figure 16:
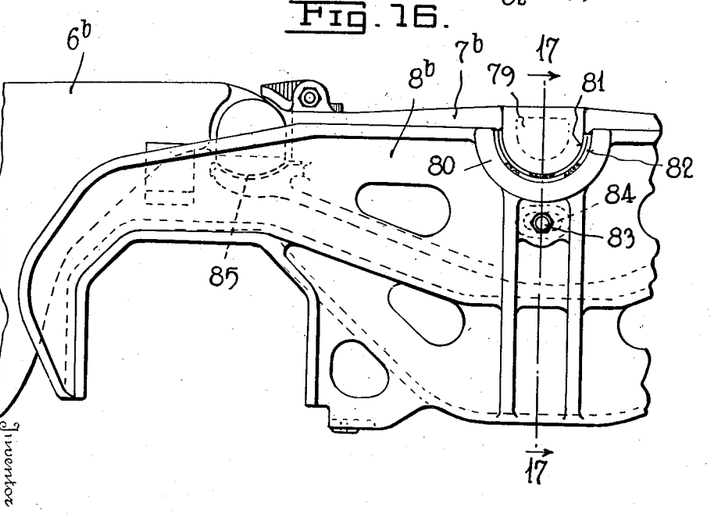
Fig. 16 is a side elevation of the structure shown in Fig. 15.
Figure 17:
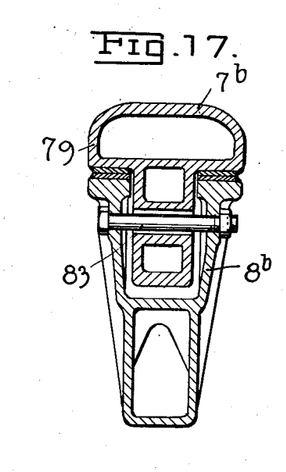
Fig. 17 is a transverse vertical sectional view of the modification shown in Figs. 15 and 16, taken on the line 17—17 of Fig. 16.

Figs. 15 to 17 inclusive illustrate other means of supporting the equalizer member 7b on the intermediate side frame member 8b. In this construction, each end frame member 6b may be supported by the equalizer 7b in the same manner as shown in Figs. 12 and 13. The equalizer, however, is rockably supported on the intermediate member by means of trunnions 79 having arc-shaped bottom portions which rest upon cooperating arc-shaped cradles 80, preferably formed integral with the intermediate member. The wearing surfaces in this construction may be provided by arc-shaped steel wear plates 81 and 82, welded respectively to the trunnions and the cradles. Since these arc-shaped surfaces have a common center which is also the axis of oscillation of the equalizer member, they accommodate both the relative horizontal and rotational movements of the equalizer and intermediate member 8b. A bolt 83 is provided to prevent separation of the intermediate member and equalizer when the truck is lifted from the rails, and the hole 84 in the equalizer which receives the bolt, is in arc-shaped slot form in order to accommodate oscillation of the equalizer.

The construction shown in Figs. 15 to 17 inclusive has the advantage of lateral stability due to the fact that the bearing surfaces between the end members and the equalizer, as typified at the point 85, lie below the bearing surfaces of the equalizer upon the cradle 80.

Figure 1:
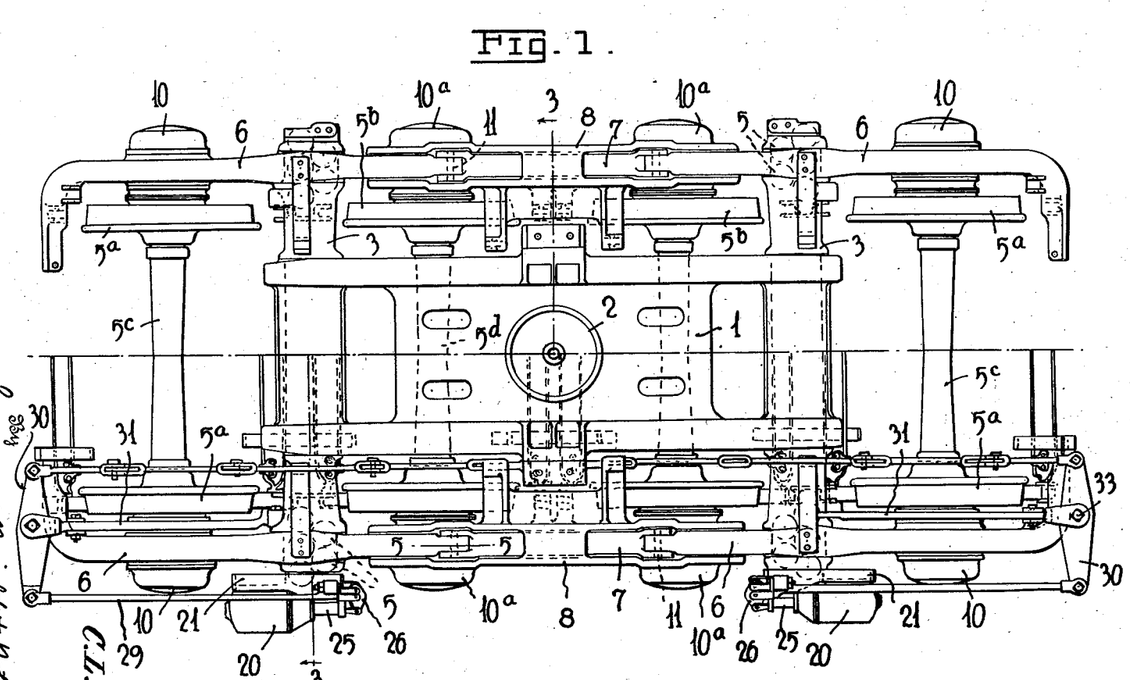
Fig. 1 is a top plan view of my improved truck with certain parts broken away and others removed to facilitate illustration.
Figure 2:
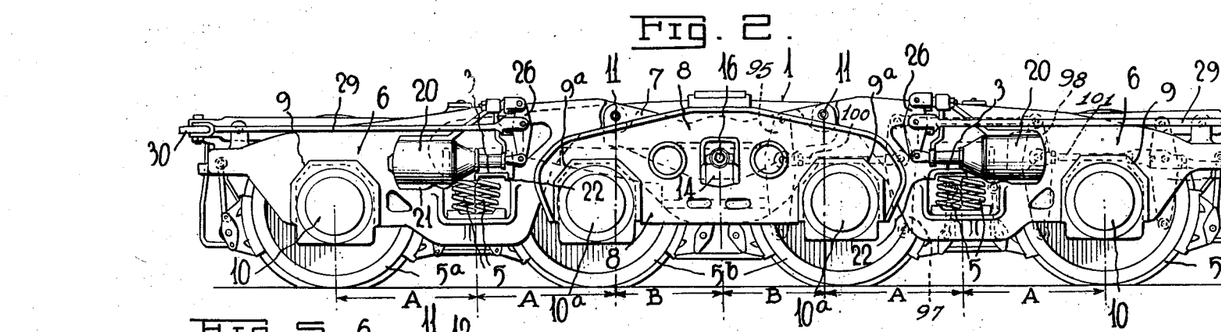
Fig. 2 is a side elevation of the same.
Figures 3, 4, 5, 6:
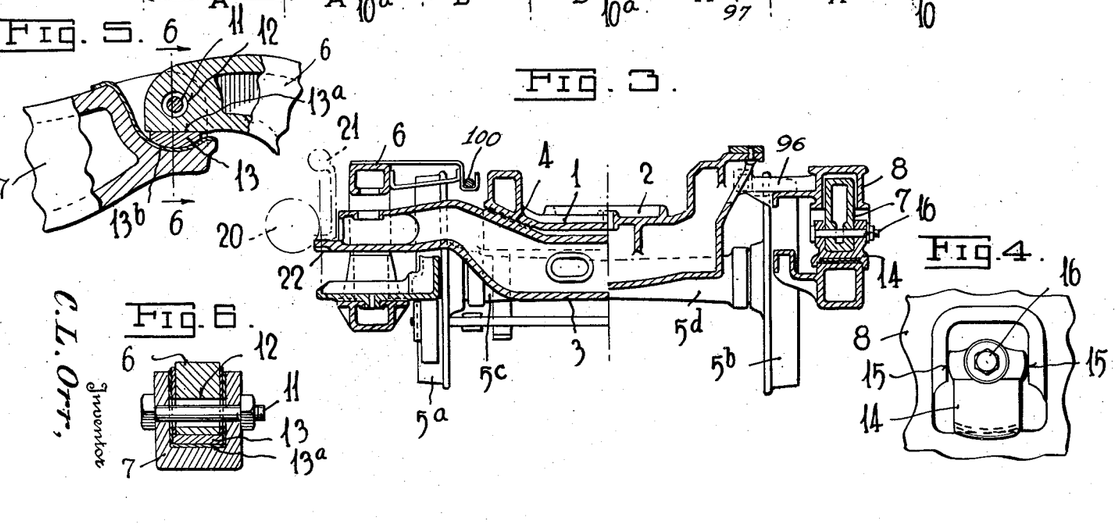
Fig. 3 is a transverse vertical sectional view, the section being taken on the line 3—3 of Fig. 1.
Fig. 4 is an enlarged view of a detail illustrated in Fig. 2.
Fig. 5 is a vertical sectional view of a detail taken on the line 5—5 of Fig. 1.
Fig. 6 is a transverse vertical sectional view of a detail taken on the line 6—6 of Fig. 5.
Figure 18:
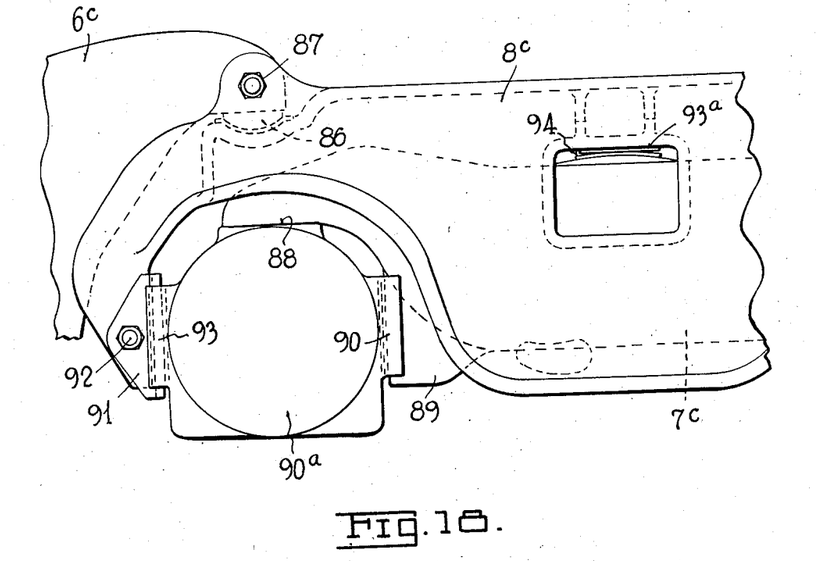
Fig. 18 is a view similar to Figs. 13 and 16, but showing a still further modification.
Figure 19:
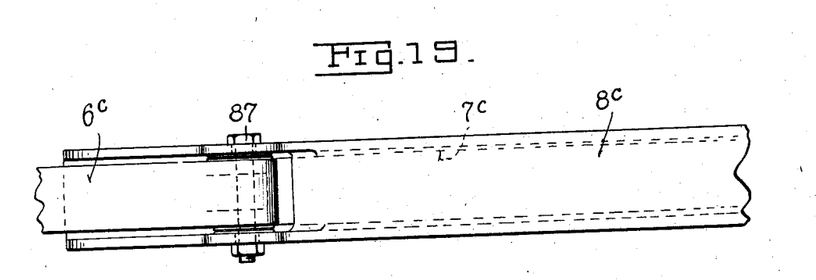
Fig. 19 is a top plan view of the structure shown in Fig. 18.

Figs. 18 and 19 show another construction in which the equalizer member 7c functions as a support for the intermediate side frame member 8c. In this construction, the equalizer member operates inside the member 8c; the intermediate frame member being in outline somewhat similar in appearance to the intermediate frame members shown in Figs. 12 to 17 inclusive. Each end member 6c, in this exemplification of the invention is supported on the intermediate frame member 8c by means of a wearing block 86, and separation of the members is prevented by bolts 87 in the same manner as shown in Fig. 5. The equalizer is supported at each end at 88 on the tops of the journal boxes of the intermediate axles, and is provided at each end with a vertical column portion 89 which engages the flanges 90 on one side of each of the intermediate axle journal boxes, thereby forming one side of the pedestal openings for receiving the intermediate journal boxes 90a. The intermediate member is provided at each end with a vertical column portion 91 pivotally connected to the member 8c by any suitable means such as a bolt 92. Of course, the members 91 are engaged by the flanges 93 at the outer sides of the journal boxes of the intermediate axles. When the equalizer and intermediate frame members are assembled, the parts 89, 91 and 88 form the two sides and top respectively of the pedestal openings for the journal boxes of the intermediate axles. The intermediate frame member 8c in this instance is rockably supported on the equalizer by means of the plane surface 93a provided in the intermediate frame member which rests on the arc-shaped surface 94 provided on the equalizer member.

During equalization operation there is relative angular movement between the intermediate frame members and equalizer which is accommodated at the pedestal openings by means of the pivotal connections between the parts 91 and the intermediate frame member.

While I have disclosed preferred embodiments of the invention, I am aware that changes may be made in the details disclosed, without departing from the spirit of the invention, as expressed in the claims.

What I claim and desire to secure by Letters Patent is:

1. In a railway car truck construction having intermediate and end axles, an intermediate side frame member supported by said intermediate axles, a seat supported by the medial portion of said member and having a concaved upper surface, a wearing block having a convex bottom surface slidably engaging said concave surface, and an equalizer member having its medial portion resting on said wearing block.

2. In a railway car truck construction having intermediate and end axles, an intermediate side frame member supported by said intermediate axles, a seat supported by the medial portion of said member and having a concaved upper surface, a wearing block having a convex bottom surface slidably engaging said concave surface, an equalizer member having its medial portion resting on said wearing block, and locking means for preventing the equalizer member from disengaging from said block.

3. In a railway car truck construction having intermediate and end axles, an intermediate side frame member supported by said intermediate axles, a seat supported by the medial portion of said member and having a concaved upper surface, a wearing block having a convex bottom surface slidably engaging said concave surface, an equalizer member having its medial portion resting on said wearing block, a cavity in the equalizer member immediately above said block, and passageways for leading lubricant from the cavity to and through said block.

4. A railway car truck construction comprising an intermediate side frame member having oppositely disposed cradles at the upper end of its medial portion, an equalizer member having trunnions at its medial portion slidably engaging said cradles, and locking means securing the intermediate member to the equalizer member, but allowing rocking movement of the equalizer member relatively to the intermediate member.

5. A railway car construction comprising an intermediate side frame member having oppositely disposed cradles at the upper end of its medial portion, an equalizer member having trunnions at its medial portion slidably engaging said cradles, locking means securing the intermediate member to the equalizer member, but allowing rocking movement of the equalizer member relatively to the intermediate member, and an end side frame member having its inner end rockably supported upon one end of the equalizer member at an elevation below said trunnions.

6. In a railway car truck, wheel-supported axles comprising first axles and intermediate axles, journal boxes mounted on said axles, intermediate side frame members supported by certain of the journal boxes, each of said members being supported by a plurality of journal boxes of the intermediate axles, an equalizer member at each side of the truck having its medial portion turnably supported upon the medial portion of one of the intermediate members for oscillation in a vertical plane, and end frame members movably connected to the end portions of the equalizer members, each end frame member being partially supported by one of the journal boxes of said first axles.

7. In a car truck, wheel-supported axles comprising end and intermediate axles, intermediate journal boxes mounted on the intermediate axles and end journal boxes mounted on the end axles, an intermediate side frame member arranged at each side of the truck and supported by a plurality of the intermediate journal boxes, an equalizer member arranged at each side of the truck and having its medial portion turnably supported upon the medial portion of one of the intermediate members for oscillation in a vertical plane, and end frame members having their inner end portions movably connected to the ends of the equalizer members, each end frame member being partially supported by one of the end journal boxes.

8. In a car truck, wheel-supported axles comprising end and intermediate axles, intermediate journal boxes mounted on the intermediate axles and end journal boxes mounted on the end axles, an intermediate side frame member arranged at each side of the truck and supported by a plurality of the intermediate journal boxes, an equalizer member arranged at each side of the truck and having its medial portion turnably supported upon the medial portion of one of the intermediate members for oscillation in a vertical plane, end frame members having their inner end portions movably connected to the ends of the equalizer members, each end frame member being partially supported by one of the end journal boxes, and transverse bolsters supported by the end frame members.

9. In a car truck, wheel-supported axles comprising end and intermediate axles, intermediate journal boxes mounted on the intermediate axles and end journal boxes mounted on the end axles, an intermediate side frame member arranged at each side of the truck and supported by a plurality of the intermediate journal boxes, an equalizer member arranged at each side of the truck and having its medial portion turnably supported upon the medial portion of one of the intermediate members for oscillation in a vertical plane, end frame members having their inner end portions movably connected to the ends of the equalizer members, each end frame member being partially supported by one of the end journal boxes, transverse bolsters supported by the end frame members, and a center bolster supported by the transverse bolsters.

10. In a car truck, wheel-supported axles comprising end and intermediate axles, intermediate journal boxes mounted on the intermediate axles and end journal boxes mounted on the end axles, an intermediate side frame member arranged at each side of the truck and supported by a plurality of the intermediate journal boxes, an equalizer member arranged at each side of the truck and having its medial portion turnably supported upon the medial portion of one of the intermediate members for oscillation in a vertical plane, end frame members having their inner end portions movably connected to the ends of the equalizer members, each end frame member being partially supported by one of the end journal boxes, springs supported by the end frame members, and transverse bolsters having their ends resting on said springs.

11. In a car truck, wheel-supported axles comprising end and intermediate axles, intermediate journal boxes mounted on the intermediate axles and end journal boxes mounted on the end axles, an intermediate side frame member arranged at each side of the truck and supported by a plurality of the intermediate journal boxes, an equalizer member arranged at each side of the truck and having its medial portion turnably supported upon the medial portion of one of the intermediate members for oscillation in a vertical plane, end frame members having their inner end portions movably connected to the ends of the equalizer members, each end frame member being partially supported by one of the end journal boxes, springs supported by the end frame members, transverse bolsters having their ends resting on the springs, and a center bolster supported by the transverse bolsters.

12. In a car truck, wheel-supported axles comprising end and intermediate axles, intermediate journal boxes mounted on the intermediate axles and end journal boxes mounted on the end axles, an intermediate side frame member arranged at each side of the truck and supported by a plurality of the intermediate journal boxes, an equalizer member arranged at each side of the truck and having its medial portion turnably supported upon the medial portion of one of the intermediate members for oscillation in a vertical plane, end frame members having their inner end portions movably connected to the ends of the equalizer members, each end frame member being partially supported by one of the end journal boxes, transverse bolsters supported by the end frame members, and a center bolster supported by the transverse bolsters and bearing upon the latter along inclined bearing surfaces.

13. In a car truck, wheel-supported axles comprising end and intermediate axles, intermediate journal boxes mounted on the intermediate axles and end journal boxes mounted on the end axles, an intermediate side frame member arranged at each side of the truck and supported by a plurality of the intermediate journal boxes, an equalizer member arranged at each side of the truck and having its medial portion turnably supported upon the medial portion of one of the intermediate members for oscillation in a vertical plane, end frame members having their inner end portions movably connected to the ends of the equalizer members, each end frame member being partially supported by one of the end journal boxes, transverse bolsters supported by the end frame members, and a center bolster having its ends resting upon the transverse bolsters, each end of the center bolster bearing upon a transverse bolster by inclined surfaces which converge toward the medial portion of the transverse bolster.

14. In a car truck, wheel-supported axles comprising end and intermediate axles, intermediate journal boxes mounted on the intermediate axles and end journal boxes mounted on the end axles, an intermediate side frame member arranged at each side of the truck and supported by a plurality of the intermediate journal boxes, an equalizer member arranged at each side of the truck and having its medial portion turnably supported upon the medial portion of one of the intermediate members for oscillation in a vertical plane, end frame members having their inner end portions movably connected to the ends of the equalizer members, each end frame member being partially supported by one of the end journal boxes, springs carried by the end frame members, transverse bolsters having their ends resting on the springs, and a center bolster having its ends bearing upon the transverse bolster by inclined surfaces which converge toward the middle of the transverse bolster.

15. In a car truck, wheel-supported axles comprising end and intermediate axles, intermediate journal boxes mounted on the intermediate axles and end journal boxes mounted on the end axles, an intermediate side frame member arranged at each side of the truck and supported by a plurality of the intermediate journal boxes, an equalizer member arranged at each side of the truck and having its medial portion turnably supported upon the medial portion of one of the intermediate members for oscillation in a vertical plane, and end frame members having their inner end portions movably connected to the ends of the equalizer members, each end frame member being partially supported by one of the end journal boxes, the inner end of each end member being rockable relatively to the end of the equalizer member to which it is connected.

16. In a car truck, wheel-supported axles comprising end and intermediate axles, intermediate journal boxes mounted on the intermediate axles and end journal boxes mounted on the end axles, an intermediate side frame member arranged at each side of the truck and supported by a plurality of the intermediate journal boxes, an equalizer member arranged at each side of the truck and having its medial portion turnably supported upon the medial portion of one of the intermediate members for oscillation in a vertical plane, end frame members mounted on the end journal boxes, and means including bearing blocks rockably mounted on the ends of the equalizer members, connecting the inner ends of the end members to the ends of the equalizer members.

17. In a car truck, wheel-supported axles comprising end and intermediate axles, intermediate journal boxes mounted on the intermediate axles and end journal boxes mounted on the end axles, an intermediate side frame member arranged at each side of the truck and supported by a plurality of the intermediate journal boxes, an equalizer member arranged at each side of the truck and having its medial portion turnably supported upon the medial portion of one of the intermediate members for oscillation in a vertical plane, end frame members mounted on the end journal boxes, and means connecting the inner ends of the end members to the ends of the equalizer members, the last-mentioned means comprising rockable bearing blocks carried by the end portions of the equalizer members and slidably supporting the inner ends of the end frame members.

18. In a truck of the character described, a wheel-supported intermediate frame member, an equalizer, means pivotally connecting the longitudinal central portions of the equalizer and intermediate member, the end portions of the intermediate member extending downwardly and provided with open tops, and wheel-supported end frame members having portions movable through the open tops of the ends of the intermediate member and movably connected to the ends of the equalizer.

CLAUDE L. ORR.